(12) United States Patent
Ryu et al.

(10) Patent No.: US 9,025,679 B2
(45) Date of Patent: May 5, 2015

(54) ADAPTIVE CODING AND MODULATION APPARATUS AND METHOD FOR FORWARD LINK IN SATELLITE COMMUNICATION

(71) Applicant: Electronics and Telecommunications Research Institute, Daejeon (KR)

(72) Inventors: Joon Gyu Ryu, Daejeon (KR); Do Huy Wang, Seoul (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/972,288

(22) Filed: Aug. 21, 2013

(65) Prior Publication Data

US 2014/0056335 A1 Feb. 27, 2014

(30) Foreign Application Priority Data

Aug. 22, 2012 (KR) .................. 10-2012-0091558

(51) Int. Cl.
*H04L 27/00* (2006.01)
*H04B 7/185* (2006.01)
*H04L 1/00* (2006.01)

(52) U.S. Cl.
CPC .......... *H04B 7/18519* (2013.01); *H04L 1/0009* (2013.01); *H04L 1/0015* (2013.01); *H04L 1/0003* (2013.01)

(58) Field of Classification Search
CPC .......... H04B 7/18513; H04B 7/18519; H04L 1/0003; H04L 1/0009; H04L 1/0015; H04L 27/0008
USPC ......... 375/259, 285, 271, 261, 279, 280, 281, 375/295, 298, 302; 370/252
See application file for complete search history.

(56) References Cited

U.S. PATENT DOCUMENTS

| 2005/0094675 | A1* | 5/2005 | Bhushan et al. | 370/527 |
| 2006/0268976 | A1* | 11/2006 | Baum et al. | 375/239 |
| 2007/0099577 | A1* | 5/2007 | Lee et al. | 455/69 |
| 2010/0232526 | A1* | 9/2010 | Tidestav | 375/259 |
| 2012/0014280 | A1* | 1/2012 | Li et al. | 370/252 |

FOREIGN PATENT DOCUMENTS

KR 1020080030331 A 4/2008

* cited by examiner

*Primary Examiner* — Betsy Deppe
(74) *Attorney, Agent, or Firm* — William Park & Associates Ltd.

(57) ABSTRACT

An adaptive coding and modulation (ACM) apparatus and method for a forward link in satellite communication is provided. The ACM apparatus may include a receiving unit to receive a signal-to-noise ratio (SNR) of a received signal, a determination unit to determine whether the SNR of the received signal is less than or equal to a threshold value, and a processing unit to execute a channel prediction algorithm when the SNR of the received signal is determined to be less than or equal to the threshold value.

13 Claims, 4 Drawing Sheets

ADAPTIVE CODING AND MODULATION APPARATUS AND METHOD FOR FORWARD LINK IN SATELLITE COMMUNICATION

CROSS-REFERENCE TO RELATED APPLICATION

This application claims the priority benefit of Korean Patent Application No. 10-2012-0091558, filed on Aug. 22, 2012, in the Korean Intellectual Property Office, the disclosure of which is incorporated herein by reference.

BACKGROUND

1. Field of the Invention

The present invention relates to an adaptive coding and modulation (ACM) apparatus and method for a forward link in satellite communication, and more particularly, to a technology that may reduce a system load by executing a channel prediction algorithm only when a signal-to-noise ratio (SNR) of a received signal is less than or equal to a threshold value (SNR_TH), taking a load of an adaptive coding and modulation controller into account.

2. Description of the Related Art

Currently, satellite communication through which a telephone service is provided to subscribers located in remote areas is being widely used.

Satellite communication implements a long distance communication using an artificial satellite outside of the atmosphere as a relay station.

Satellite communication increases a service coverage area and ensures ultra-high speed transmission using high-frequency electric waves. One of the types of satellites being used is a geostationary satellite in which has a geostationary orbit, with an orbital period that is the same as the rotation period of the Earth. A geostationary satellite has a property of remaining permanently fixed in exactly the same position in the sky. Such a satellite is often used for satellite communication purposes.

According to the characteristics of microwaves, satellite communication allows a high-speed, large-capacity communication and a wide service coverage area, for example, an entire region of a predetermined country.

Also, satellite communication ensures reliability of communication irrespective of topography, and is robust against a disaster. However, because a travel time of electric waves, for example, about 0.24 seconds, disadvantages in terms of a propagation delay and a lack of data security are present in voice communication.

Due to use of a solar cell as a power source, satellite communication may experience a temporary loss of communication when a satellite passes into the shadow of the Earth or during heavy rain.

However, a separate signal line for communication in shortwave bands or higher passing through the ionosphere is not required for satellite communication, and thus is available for a transcontinental long-distance communication or communication in a country with mountainous areas.

Accordingly, satellite communication is being beneficially used for international communication, domestic long-distance communication, maritime communication, aeronautical communication, and the like.

Initially, applications of satellite communication faced limitations with regard to international telecommunications or television (TV) broadcasting due to a high cost of a satellite, but with technological advancements and cost reductions, satellite communication has been extended to various types of applications, for example, data communication, remote data gathering, personal computer (PC) communication, Internet communication, cable TV (CATV)/video distribution, distance education, intra-company communication, leased lines, videoconferencing, newspaper transmission, satellite news gathering (SNG), broadcasting of various events, and the like.

A conventional continuous coding and modulation (CCM) standard, digital video broadcasting satellite second generation (DVB-S2), uses a coding scheme and a modulation scheme selected for a predetermined availability unchangeably throughout a service coverage area. This CCM scheme needs to maintain a high margin in accordance with system availability standards, even under clear sky conditions.

In a case in which a CCM mode is applied to satellite communication, when rain attenuation is severe, attenuation of the entire satellite link may increase, resulting in discontinuity of the link. An adaptive coding and modulation (ACM) may increase an average system throughput and availability.

SUMMARY

According to an aspect of the present invention, there is provided an adaptive coding and modulation (ACM) apparatus including a receiving unit to receive a signal-to-noise ratio (SNR) of a received signal, a determination unit to determine whether the SNR of the received signal is less than or equal to a threshold value, and a processing unit to execute a channel prediction algorithm when the SNR of the received signal is determined to be less than or equal to the threshold value.

The receiving unit may be provided with a low-pass filter to filter the received signal at a low frequency.

The determination unit may set the threshold value by applying an operating margin to an SNR of a highest modulation scheme among modulation schemes of an ACM system.

The processing unit may execute the channel prediction algorithm to predict the SNR in N seconds.

The processing unit may determine a modulation and coding (MODCOD) by comparing the predicted SNR to the threshold value for each MODCOD.

According to another aspect of the present invention, there is provided an adaptive coding and modulation (ACM) method including receiving a signal-to-noise ratio (SNR) of a received signal, determining whether the SNR of the received signal is less than or equal to a threshold value, and executing a channel prediction algorithm when the SNR of the received signal is determined to be less than or equal to the threshold value.

The receiving of the SNR of the received signal may include filtering the SNR of the received signal at a low frequency.

The determining of whether the SNR of the received signal is less than or equal to the threshold value may include setting the threshold value by applying an operating margin to an SNR of a highest modulation scheme among modulation schemes of an ACM system.

The executing of the channel prediction algorithm may include executing the channel prediction algorithm to predict the SNR in N seconds, and determining a modulation and coding (MODCOD) by comparing the predicted SNR to the threshold value for each MODCOD.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
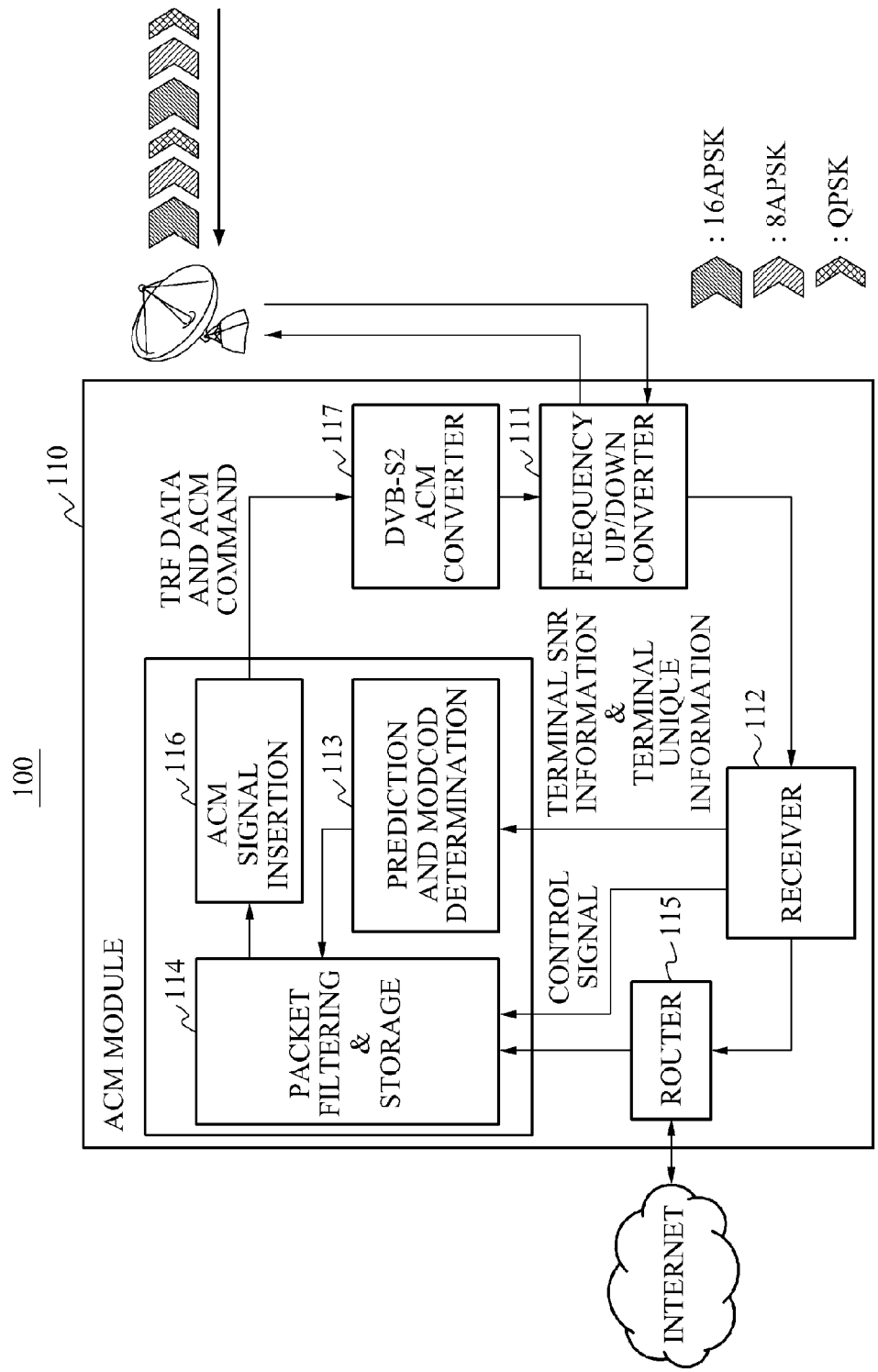
FIGS. 1 and 2 are diagrams illustrating a configuration for providing adaptive coding and modulation (ACM) through a satellite communication system including an ACM apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
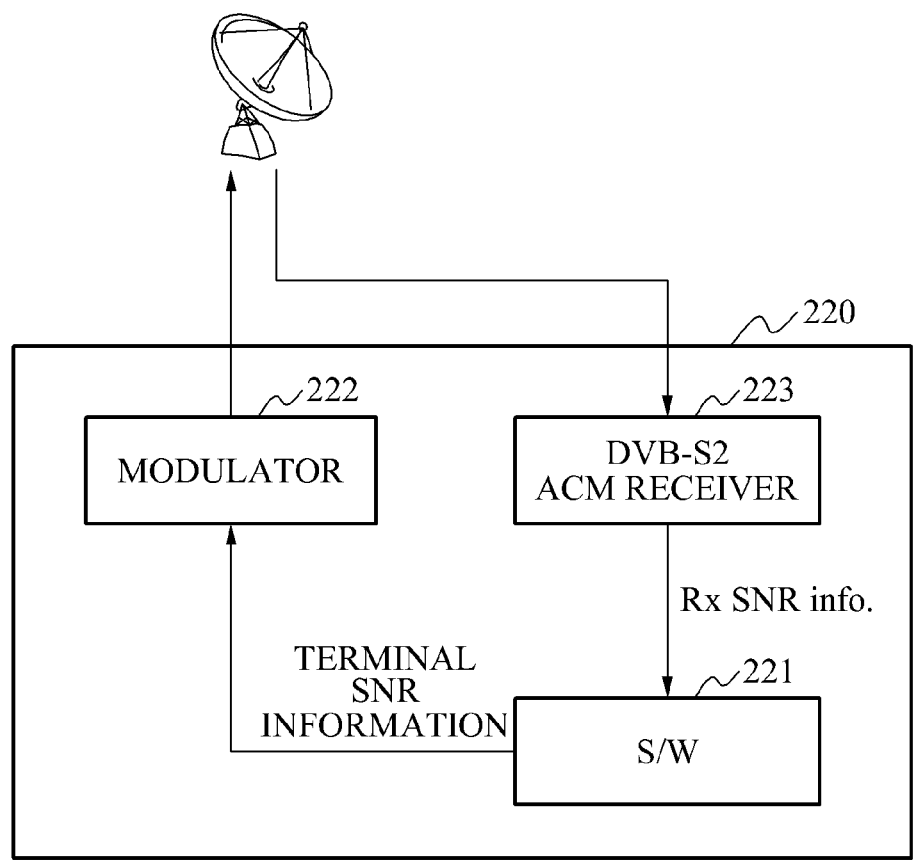

FIGS. 1 and 2 are diagrams illustrating a configuration for providing adaptive coding and modulation (ACM) through a satellite communication system 100 including an ACM apparatus according to an exemplary embodiment of the present invention.

The satellite communication system 100 may include a hub 110 of FIG. 1 and an earth terminal 220 of FIG. 2.

To implement ACM in the satellite communication system 100, first, each terminal 220 may provide notification of a channel state, for example, a signal-to-noise ratio (SNR) through a return channel.

The hub 110 may receive channel state information from each terminal 220 through a frequency up/down-converter module 111. The received information may be transmitted to an ACM module through a receiver 112 and a router 115, followed by packet filtering and storage in operation 114.

Based on the channel state information received from each terminal 220 through the receiver 112, a modulation and coding (MODCOD) may be determined in operation 113.

In operation 114, the input data may be stored in a buffer based on the determined MODCOD.

After an ACM signal is inserted into the packet-filtered information in operation 116, tuned radio frequency (TRF) data and an ACM command may be transmitted to a digital video broadcasting satellite second generation (DVB-S2) ACM modulator module 117. The data stored in the buffer and the ACM command may be transmitted to each terminal 220 through the frequency up/down-converter module 111.

In this instance, the terminal 220 may transmit SNR information to the hub 110, and the hub 110 may predict a channel and determine an MODCOD for each terminal 220. The determining of the MODCOD may include determining a modulation scheme and a channel coding rate. Also, the ACM module may transmit the data stored in the buffer and the ACM command to the DVB-S2 ACM modulator module 117.

The application of ACM may lead to a constant symbol rate on a forward link and a variable data rate based on a predetermined MODCOD.

The terminal 220 may receive the data or a control signal from the hub 110 through a DVB-S2 ACM receiver 223. The DVB-S2 ACM receiver 223 may receive SNR information by verifying the received information.

The SNR information may be processed to unique identifier information based on a characteristic of the terminal 220 through a software 221, and may be fed back to the hub 110 through a modulator 222.

Figure 3:
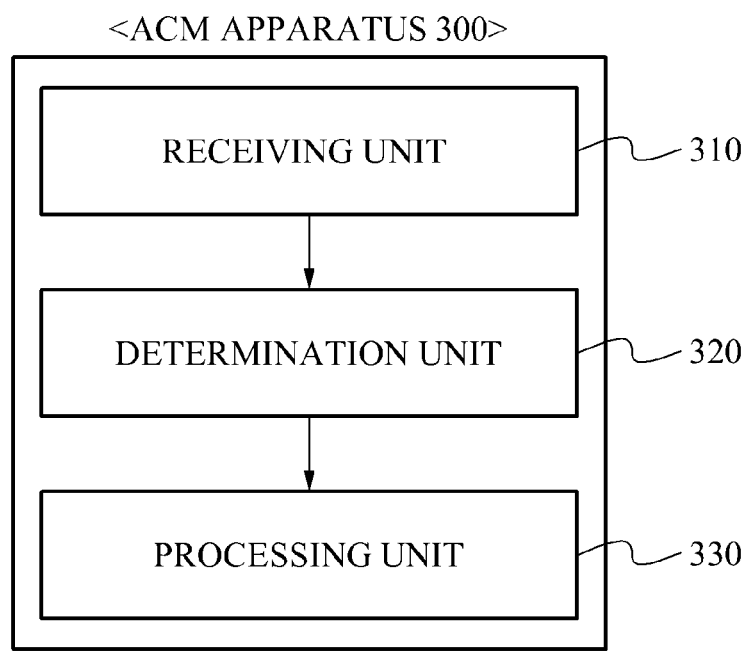
FIG. 3 is a block diagram illustrating an internal structure of an ACM apparatus according to an exemplary embodiment of the present invention.

FIG. 3 is a block diagram illustrating an internal structure of an ACM apparatus 300 according to an exemplary embodiment of the present invention.

A conventional ACM involves transmitting a queue by service class or region based on climatic conditions, resulting in an unclear channel state transition. In some instances, when a delay is about 250 milliseconds (ms) long, a satellite link may experience discontinuity.

In a satellite communication system, the conventional ACM conducts a continuous channel prediction using an SNR of a received signal. As a number of terminals increases, a system load caused by a prediction operation increases.

The present invention may reduce a system load remarkably by conducting a channel prediction selectively using a threshold value SNR_TH.

The ACM apparatus 300 may include a receiving unit 310, a determination unit 320, and a processing unit 330.

The receiving unit 310 may receive an SNR of a received signal.

The receiving unit 310 may be provided with a low-pass filter (LPF) to filter the received signal at a low frequency.

The determination unit 320 may determine whether the SNR of the received signal is less than or equal to a threshold value SNR_TH.

For example, the determination unit 320 may set the threshold value SNR_TH by applying an operating margin to an SNR of a highest modulation scheme among modulation schemes of the ACM system.

A conventional ACM conducts a continuous channel prediction using an SNR of a received signal. As a number of terminals increases, a system load increases.

The processing unit 330 may execute a channel prediction algorithm when the SNR of the received signal is determined to be less than or equal to the threshold value SNR_TH.

Accordingly, a system load may be reduced remarkably by executing a channel prediction algorithm only under a predetermined condition.

The threshold value SNR_TH may be set by applying an operating margin to an SNR of a highest modulation scheme, for example, 16APSK LDPC 3/4, among modulation schemes of the ACM system.

Due to an early prediction error, a predicted value may be determined to be effective from a point of time corresponding to a difference of a predetermined value in XdB between the predicted value and the SNR of the received signal, and the channel prediction algorithm may be executed from the point of time.

When the SNR of the received signal is greater than the threshold value SNR_TH, the SNR in N seconds may be predicted.

An MODCOD may be determined by comparing the predicted SNR to the threshold value SNR_MOD_TH for each MODCOD.

The channel prediction algorithm may use a method using an adaptive filter or a method using an inclination.

The processing unit 330 may predict the SNR in N seconds by executing the channel prediction algorithm.

Also, the processing unit 330 may determine the MODCOD by comparing the predicted SNR to the threshold value SNR_MOD_TH for each MODCOD.

Figure 4:
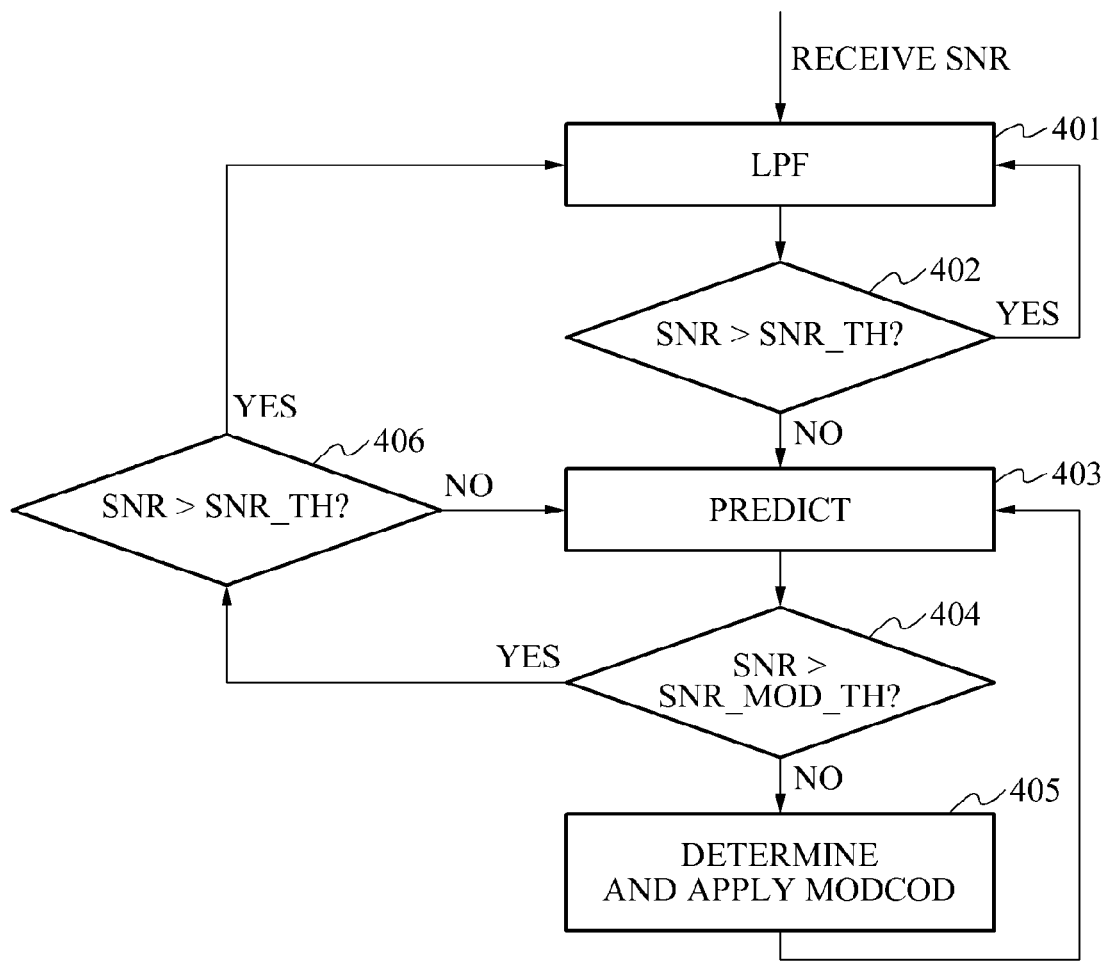
FIG. 4 is a flowchart illustrating an ACM method according to an exemplary embodiment of the present invention.

FIG. 4 is a flowchart illustrating an ACM method according to an exemplary embodiment of the present invention.

Referring to FIG. 4, in operation 401, the method may receive an SNR of a received signal after passing the received signal through an LPF.

In operation 402, the method may determine whether the SNR of the received signal is less than or equal to a threshold value SNR_TH.

In operation 403, when the SNR of the received signal is determined to be less than or equal to the threshold value SNR_TH, the method may execute a channel prediction algorithm.

When the SNR of the received signal is less than or equal to the threshold value SNR_TH, the method may predict the SNR in N seconds.

In operation 404, the method may compare the predicted SNR to the threshold value SNR_MOD_TH for each MODCOD.

In operation 406, when the predicted SNR is greater than the threshold value SNR_MOD_TH for each MODCOD, the method may compare the predicted SNR to the threshold value SNR_TH again.

When the predicted SNR is greater than the threshold value SNR_TH, the method may revert to operation 401.

When the predicted SNR is less than or equal to the threshold value SNR_TH, the method may predict the SNR in N seconds again.

In operation 405, when the predicted SNR is less than or equal to the threshold value SNR_MOD_TH for each MODCOD, the method may determine the MODCOD and may apply the determined MODCOD to the channel prediction algorithm.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the exemplary embodiments of the present invention, a system load may be reduced by executing a channel prediction algorithm only when an SNR of a received signal is less than or equal to a threshold value SNR_TH, taking account of a load of an ACM controller.

According to the exemplary embodiments of the present invention, broadband stability may be enhanced by reducing a system load within a service coverage area being served by one satellite.

According to the exemplary embodiments of the present invention, geographical obstacles may be overcome by reducing a system load, leading to improvements in disaster-resistance and quality and reliability of communication.

According to the exemplary embodiments of the present invention, high-speed broadband transmission attributed to high-frequency electric waves may be enabled with a small amount of resources by reducing a system load.

According to the exemplary embodiments of the present invention, point-to-multipoint broadcast communication and multiple access (MA) may be achieved with a small amount of resources by reducing a system load.

According to the exemplary embodiments of the present invention, an earth-based terminal may be provided with stable functions as a mobile station, for example, mobility, unrestricted and rapid access, and the like, with a small amount of resources by reducing a system load.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An adaptive coding and modulation (ACM) apparatus comprising:
   a receiving unit to receive a signal-to-noise ratio (SNR) of a received signal;
   a determination unit to determine whether the SNR of the received signal is less than or equal to a threshold value; and
   a processing unit to execute a channel prediction algorithm when the SNR of the received signal is determined to be less than or equal to the threshold value.

2. The apparatus of claim 1, further comprising a low-pass filter to filter the SNR of the received signal at a low frequency.

3. The apparatus of claim 1, wherein the determination unit sets the threshold value by applying an operating margin to an SNR of a highest modulation scheme among modulation schemes of an ACM system.

4. The apparatus of claim 1, wherein the processing unit executes the channel prediction algorithm to predict a predicted SNR.

5. The apparatus of claim 4, wherein the processing unit determines a modulation and coding (MODCOD) by comparing the predicted SNR to the threshold value for each MODCOD.

6. An adaptive coding and modulation (ACM) method comprising:
   receiving, in a receiver unit, a signal-to-noise ratio (SNR) of a received signal;
   determining, by a determination unit, whether the SNR of the received signal is less than or equal to a threshold value; and
   executing, by a processing unit, a channel prediction algorithm when the SNR of the received signal is determined to be less than or equal to the threshold value.

7. The method of claim 6, wherein the receiving of the SNR of the received signal comprises filtering the SNR of the received signal at a low frequency.

8. The method of claim 6, wherein the determining of whether the SNR of the received signal is less than or equal to the threshold value comprises setting the threshold value by applying an operating margin to an SNR of a highest modulation scheme among modulation schemes of an ACM system.

9. The method of claim 6, wherein the executing of the channel prediction algorithm comprises:
   executing the channel prediction algorithm to predict a predicted SNR; and determining a modulation and coding (MODCOD) by comparing the predicted SNR to the threshold value for each MODCOD.

10. A non-transitory computer-readable recording medium comprising a program for implementing an adaptive coding and modulation method comprising:
  receiving a signal-to-noise ratio (SNR) of a received signal;
  determining whether the SNR of the received signal is less than or equal to a threshold value; and
  executing a channel prediction algorithm when the SNR of the received signal is determined to be less than or equal to the threshold value.

11. The non-transitory computer-readable recording medium of claim 10, wherein the receiving of the SNR of the received signal comprises filtering the SNR of the received signal at a low frequency.

12. The non-transitory computer-readable recording medium of claim 10, wherein the determining of whether the SNR of the received signal is less than or equal to the threshold value comprises setting the threshold value by applying an operating margin to an SNR of a highest modulation scheme among modulation schemes of an ACM system.

13. The non-transitory computer-readable recording medium of claim 10, wherein the executing of the channel prediction algorithm comprises:
  executing the channel prediction algorithm to predict a predicted SNR; and
  determining a modulation and coding (MODCOD) by comparing the predicted SNR to the threshold value for each MODCOD.

* * * * *